United States Patent [19]

Guey

[11] Patent Number: 5,058,446
[45] Date of Patent: Oct. 22, 1991

[54] ELEVATION MECHANISM OF TRIPOD

[75] Inventor: Lee S. Guey, Tokyo, Japan

[73] Assignee: Asanuma & Company Ltd., Tokyo, Japan

[21] Appl. No.: 441,484

[22] Filed: Nov. 27, 1989

[51] Int. Cl.⁵ .................. F16M 11/04; F16H 1/12; F16H 29/20

[52] U.S. Cl. .................. 74/89.17; 74/422; 248/404; 248/161

[58] Field of Search .............. 74/89.17, 422, 29, 30; 248/404, 161, 295.1, 297.3, 422, 188.2

[56] References Cited

U.S. PATENT DOCUMENTS

| | | | |
|---|---|---|---|
| 1,573,496 | 2/1926 | Jansson et al. | 248/404 X |
| 2,508,122 | 5/1950 | Mooney | 248/404 |
| 2,883,875 | 4/1959 | Davidson | 74/422 X |
| 3,208,711 | 9/1965 | Pagiluso | 248/404 X |
| 4,598,451 | 7/1986 | Ohki | 74/422 X |
| 4,715,238 | 12/1987 | Bernardi | 74/89.17 X |

FOREIGN PATENT DOCUMENTS

| | | | |
|---|---|---|---|
| 2143472 | 8/1971 | Fed. Rep. of Germany | 248/404 |
| 57-103969 | 6/1982 | Japan | 74/422 |
| 59-26663 | 2/1984 | Japan | 74/422 |

Primary Examiner—Allan D. Herrmann
Assistant Examiner—Julie Krolikowski
Attorney, Agent, or Firm—Schwartz & Weinrieb

[57] ABSTRACT

An elevation mechanism of a tripod in which a vertical column having a universal head fixed at its upper end is elevationally journalled within a thrust bearing hole bored within a metal fitting base by means of a lifting mechanism of the rack and pinion type and within which is journalled one end portion of three standard legs of a tipod which are equally disposed about the periphery thereof and which are pivotable with respect thereto the improved elevation mechanism of the tripod in which the vertical column comprises an aluminum tubing, and a rack member molded as a separate member with respect to the column from a suitable synthetic resin and which is formed with a rack gear is integrated within one side of the vertical column along the axial direction thereof, while a pinion gear is rotatably supported within the metal fitting base so as to be meshed with the rack gear.

5 Claims, 3 Drawing Sheets

ELEVATION MECHANISM OF TRIPOD

FIELD OF THE INVENTION

The present invention relates to an elevation mechanism of a tripod for supporting a camera or video camera in which a vertical column journalled within a metal fitting of the tripod is movable in the vertical direction between an infinite number of vertical positions or levels relative to the supporting legs of the tripod.

DESCRIPTION OF THE RELATED ART

Within a tripod for a camera or video camera, a tripod provided with an elevation mechanism has heretofore been used in which a vertical column whose upper portion is mounted with a universal head is journalled upon an upper portion of the tripod so as to be slidable in the vertical direction, whereby the height position of the camera may be changed. The elevation mechanism of the tripod of this kind is shown in FIG. 4 and is seen to comprise a vertical column 52, having a universal head, not shown, at its upper end which is journalled within a metal fitting base 51 to which an end portion of three standard legs 50, 50, 50 of a tripod is pivotally journalled upon the periphery of base 51, and wherein the universal head, not shown, and the camera or video camera, also not shown, may have the relative height or vertical positions thereof changed by means of a lifting mechanism of the rack and pinion type. Namely, the vertical column 52 which is slidably journalled in the axial direction relative to a thrust bearing hole 53 formed within the metal fitting base 51 extends with a rack gear 54 which is formed in the axial direction upon one side thereof and a pinion gear 55 which is meshed with the rack 54 is journalled within the metal fitting base 51, and is adapted to be turned by means of an elevation handle 56, thereby lifting and lowering the vertical column 52 as a result of the interaction of the rack 54 and the pinion 55.

However, in accordance with the tripod of this kind, each member was generally made of aluminum in order to render them light in weight and the vertical column 52 of the elevation mechanism was made of from a drawn aluminum tube. Accordingly, the rack gear 54 formed upon the vertical column 52 was required to be formed by means of a precision machining process which resulted in an increased number of manufacturing steps and increased production costs.

In addition the rack gear 54 of the vertical column 52 exhibited relatively poor antiabrasion properties and become worn as a result of the meshing of the rack gear 54 and the pinion gear 55, which resulted in a clattering so that there was the drawback of producing undesirable noise upon, for example, a video tape due to the fact that the operating sound of the elevation mechanism was sensed by means of the microphone of the camera particularly when a video camera was being used upon the tripod.

OBJECTS OF THE INVENTION

The present invention has therefore been conceived in view of the foregoing problems and a first object of the present invention is to provide a novel elevation mechanism of a tripod which permits the achievement of good product quality control and at the same time facilitates decreased manufacturing cost. Another object of the present invention is to provide an elevation mechanism of a tripod which effectively eliminates clattering when used so as to render the operating sound substantially quiet where the mechanism exhibits excellent operating properties and stillness.

SUMMARY OF THE INVENTION

A primary feature of the elevation mechanism of the tripod according to this invention resides in the fact that the foregoing problems are eliminated by constructing the mechanism with a vertical column slidably journalled within a metal fitting base of the tripod and a rack gear the vertical column separate member, and, in addition, that in an elevation mechanism of a tripod in which the vertical column mounted with the universal head at its top is elevationally journalled by means of a lifting mechanism of the rack and pinion type within a thrust bearing hole formed within the metal fitting base to which an end portion of three standard legs is pivotally journalled about the metal fitting base, the vertical column is formed as a drawn aluminum tube. The rack member which is separately molded and formed with a rack gear is integrally fixed upon one side of the vertical column, and a pinion gear mounted upon the metal fitting base is meshed with the rack gear.

Furthermore, the rack member is molded from a suitable synthetic resin, and is preferably constructed in such a way that the rack member is fitted within a dovetail groove formed within one side of the vertical column so as to extend in the axial direction thereof.

Accordingly, in accordance with the foregoing construction, the rack member molded as a separate member with respect to the vertical column is fixed within one side of the vertical column which is made of aluminum tubing so that a high precision rack gear can be obtained without requiring the rack gear to be formed by means of a gear cutting operations.

Furthermore, a variety of materials capable of being molded, such as, for example, a synthetic resin may be used, and, for example, in the case of using a synthetic resin, the antiabrasion property of the rack member with respect to the pinion gear is remarkably improved, and thus, the clattering of the thrust bearing portion due to the aforenoted abrasion is eliminated, and the meshing sound of the rack gear and the pinion gear may be minimized by the selection of the particular resin, making the operating sound produced at the time that the lifting of the vertical column is made to be minimized which is a primary effect of this invention.

BRIEF DESCRIPTION OF THE DRAWINGS

These and other objects and advantages of the invention will appear more clearly from the following specification when considered in connection with the accompanying drawings, in which like reference characters designate like or corresponding parts throughout the several views and wherein.

DESCRIPTION OF THE PREFERRED EMBODIMENTS

An embodiment of the elevation mechanism of the tripod according to this invention will be described in the following by referring to FIG. 1 through FIG. 3.

Figure 1:
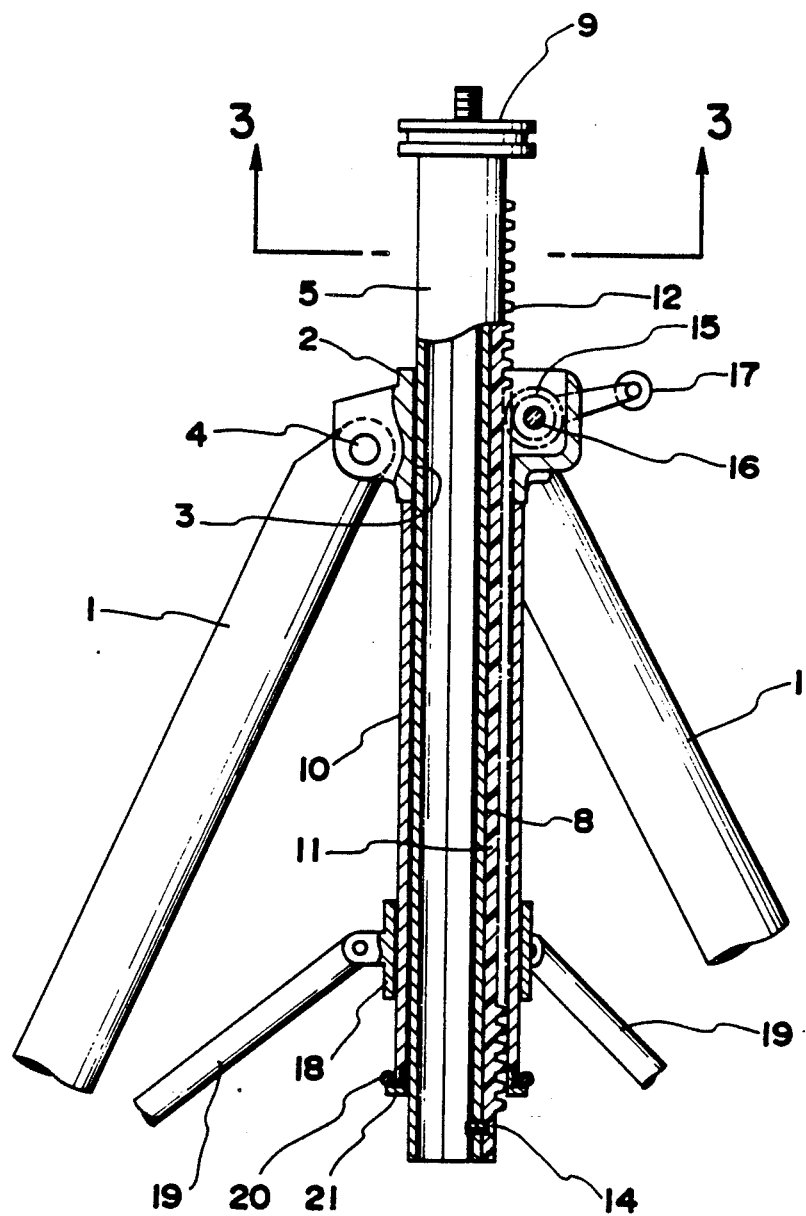
FIG. 1 is a partly cut-away cross section of a head portion of a tripod showing an embodiment of an elevation mechanism of a tripod according to this invention.

FIG. 1 is a cross sectional view showing a head portion of a tripod, in which each base end portion of three standard legs 1, 1, 1 is journalled so as to be pivotable by means of a pin shaft 4 respectively mounted upon the periphery of a metal fitting base 2 which is formed with a thrust bearing hole 3 in a central portion thereof, and wherein a cylindrical shaft 10 whose inside diameter is continuous from a lower end of the thrust bearing hole 3 is integral there with and projects downwardly therefrom.

Figure 2:
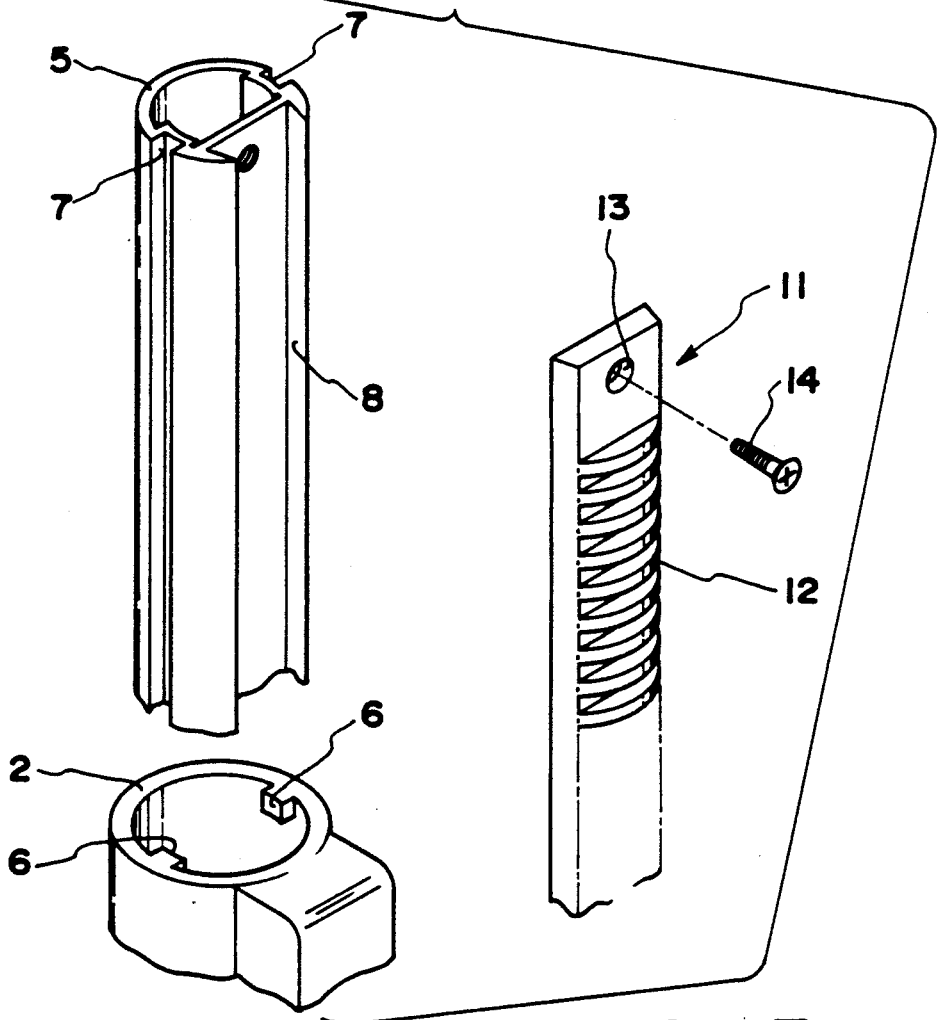
FIG. 2 is an exploded perspective view of an essential part of the rack element of the invention.
Figure 3:
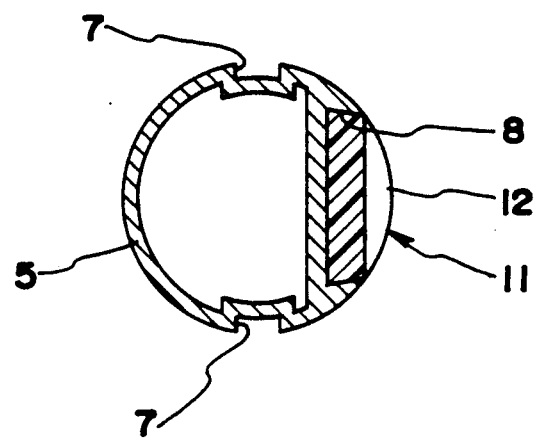
FIG. 3 is an enlarged cross sectional view of the rack mechanism taken along the line 3—3 in FIG. 1.
Figure 4:
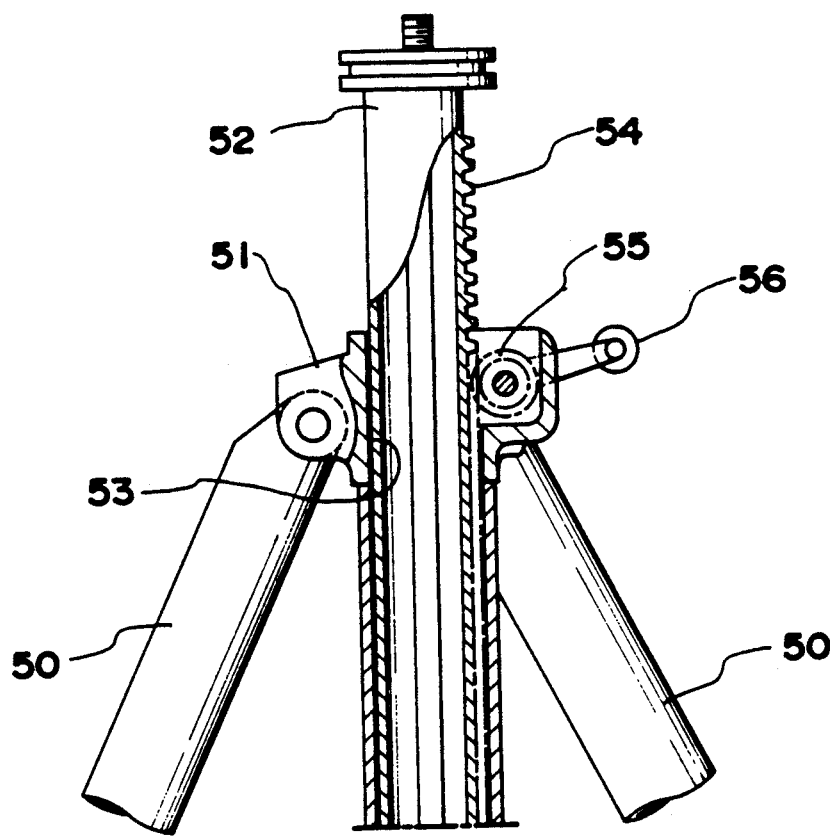
FIG. 4 is a cross sectional view of an essential part of a conventional elevation mechanism of a tripod.

Numeral 5 denotes a vertical column that is slidably inserted in the axial direction within the thrust bearing hole 3 of the metal fitting base 2, and as best appreciated from FIG. 2, column 5 is provided with guide grooves 7, 7 which extend in the axial direction so as to cooperate with whirl-stops 6, 6 which project radially inwardly from an inner wall of the thrust bearing hole 3 so that the vertical column is permitted to move axially relative to fitting base 2 and shaft 10 while being prevented from turning, rotating, or pivoting with respect thereto turning the lower end of column 5 being inserted into cylindrical shaft 10. The vertical column 5 comprises aluminum tubing, and a dovetail groove 8 extending in the axial direction is formed within one side thereof while its upper end is fixed with an upper member 9 for threadedly ingaging a universal head (not shown in the drawing), its lower end being disposed within cylindrical shaft 10. Numeral 11 denotes a rack member made of a suitable synthetic resin having a predetermined amount of elasticity and is molded within a suitable metal mold, a base portion thereof fitting within the dovetail groove 8 in the axial direction, and forming a rack gear 12 whose teeth arranged in parallel in the axial direction are formed on an arc shaped peripheral surface of the member 11. Tapping screws 14, 14 are inserted into small holes 13, 13 bored at both ends of member 11 so as to be threadedly engaged within a bottom wall of the dovetail groove 8 whereby member 11 and column 5 fixed together are integrally.

Continuing further, it is seen that the pinion gear 15 rotatably journalled within the metal fitting base 2 by means of a pinion shaft 16 so as extend radially inwardly of the inner surface of the base 2 and the thrust bearing hole 3 so as to be meshed with the rack gear 12 of the rack member inserted through the thrust bearing hole 3, and an elevation handle 17 is journalled upon an outer end of the rotary shaft 16 of the pinion gear 15, the pinion gear 15 also being preferably molded from a suitable synthetic resin similar to that of the rack member 11.

Numeral 18 in the drawing denotes a support lever holding ring externally disposed about cylindrical shaft 10 extends continuously in the downward direction which is continuous from the thrust bearing hole 3 of the metal fitting base 2, and one end of each support lever 19, 19, 19 connected to the legs 1, 1, 1 is journalled upon the outer periphery thereof. In addition numeral 20 denotes a ring for buffering an abutment which is engaged with a whirl-stop ring 21 which is fixed to the lower end of the cylindrical shaft 10.

As described in the foregoing, according to the elevation mechanism of the tripod having the above-mentioned construction, the rack member is formed as a separate member with respect to the column 5, and its material is different from the vertical column, and both the rack member and the pinion are produced by molding, so that a high precision rack gear may be formed without performing a gear cutting machining of operation upon the rack gear, which results in the elimination of increased costs of production normally incurred by means of the gear cutting machining operation. In addition a variety of materials which are capable of being molded such as, for example, the synthetic resin may be used, and a antiabrasion property between the pinion gear and the rack member is remarkably improved as a result of the aforenoted molding of the rack member and pinion gear from a suitable synthetic resin, while clattering of the thrust bearing portion as a result of wear and tear of the components may be eliminated, whereby the meshing sound of the rack gear with the pinion gear can be minimized, and thus the operating sound at the time of lifting the vertical column can be eliminated which are primary features of this invention, such that the effects of practice of this invention when in fact utilized are extremely great.

It is, of course, to be understood that this invention is, by no means, limited to the specific showing in the drawings but also comprises any modifications within the scope of the appended claims. Consequently, the present invention may be practiced otherwise than as specifically described herein.

What is claimed is:
1. An elevation mechanism for a tripod, comprising:
a metal fitting base;
three support legs pivotably mounted upon said metal fitting base so as to form said tripod;
an axial bore formed within said metal fitting base so as to have a substantially circular configuration defined about an inner peripheral wall surface thereof;
a vertical metal column vertically movable within said axial bore of said metal fitting base, said vertical metal column having a substantially circular configuration defined about an outer peripheral wall surface thereof, except for a predetermined side wall portion thereof, for mating movable engagement along said inner peripheral wall surface of said metal fitting base;
recess means formed within said side wall portion of said vertical metal column;
a rack member, fabricated from a synthetic resin, having a base section thereof fixedly mounted within said recess means of said vertical metal column, and a plurality of rack teeth extending outwardly from said recess means of said vertical metal column and having an arcuately shaped configuration which matches with and continues said substantially circular configuration defined about said outer peripheral wall surface of said vertical metal column within the region of said side wall portion thereof such that said vertical metal column and said rack teeth of said rack member together define a substantially circular configuration about the entire outer peripheral wall surface of said vertical metal column, including said predetermined side wall portion thereof; and a pinion gear, fabricated from a synthetic resin, rotatably mounted upon said metal fitting base and enmeshed with said teeth of said rack member, whereby when said pinion gear is rotated, said rack member will be linearly moved in either one of two directions without abrasive wear being developed between said rack member and said pinion gear in view of the fabrication of both of said pinion gear and said rack member from a synthetic resin material.

2. An elevation mechanism as set forth in claim 1, further comprising:

a pair of diametrically opposite lugs integrally formed upon internal peripheral side wall portions of said metal fitting base; and a pair of diametrically opposite axially extending grooves defined within said outer peripheral wall surface of said vertical metal column for mating engagement with said pair of diametrically opposite lugs of said metal fitting base for preventing rotation of said vertical metal column with respect to said metal fitting base during vertical movement of said vertical metal column with respect to said metal fitting base.

3. An elevation mechanism as set forth in claim 1, wherein:

said vertical metal column comprises aluminum tubing.

4. An elevation mechanism as set forth in claim 1, further comprising:

means provided upon an upper end of said vertical metal column for threadedly engaging and supporting a universal head of a camera.

5. An elevation mechanism as set forth in claim 1, further comprising:

a plurality of support levers interconnecting said support legs to a shaft integral with said metal fitting base and depending downwardly from said metal fitting base so as to guide said vertical metal column when said vertical metal column moves vertically within said metal fitting base.

* * * * *